United States Patent [19]

Albert

[11] Patent Number: 4,469,221

[45] Date of Patent: Sep. 4, 1984

[54] PAPERMAKERS FABRIC OF LINK AND PINTLE CONSTRUCTION

[75] Inventor: Hans Albert, Vienna, Austria

[73] Assignee: Scapa Inc., Waycross, Ga.

[21] Appl. No.: 422,376

[22] Filed: Sep. 24, 1982

[51] Int. Cl.³ .................................. B65G 17/06
[52] U.S. Cl. .............................. 198/851; 198/853; 245/9; 428/222; 428/223; 428/294; 474/207; 474/213; 474/226
[58] Field of Search ............... 162/348, 358, DIG. 1; 428/131, 137, 138, 222, 223, 294; 245/9; 198/851, 853; 474/247, 207, 213–217, 226, 228–231

[56] References Cited

U.S. PATENT DOCUMENTS

| | | | |
|---|---|---|---|
| 1,119,736 | 12/1914 | Wagner | 198/193 |
| 1,441,836 | 1/1923 | Davis | 198/203 |
| 2,188,025 | 1/1940 | Weiss | 198/203 |
| 2,270,858 | 1/1942 | Gallamore | 198/193 |
| 2,572,236 | 10/1951 | Anderson | 210/175 |
| 3,231,069 | 1/1966 | Lanham | 198/853 |
| 4,050,323 | 9/1977 | I'Anson | 198/853 |
| 4,140,025 | 2/1979 | Lapeyre | 198/851 |
| 4,159,763 | 7/1979 | Kewley et al. | 474/207 |

*Primary Examiner*—James J. Bell
*Attorney, Agent, or Firm*—Fleit, Jacobson, Cohn & Price

[57] ABSTRACT

A papermakers fabric formed from a plurality of elongated, generally cylindrical pintles which are positioned in spaced relationship relative to each other and with their axes substantially parallel to define the width of the fabric. A plurality of link members interconnect the several pintles to define the length of the fabric. Each link interconnects two pintles and the configuration of the link can be varied to facilitate the manufacture thereof, to facilitate construction of the fabric, and to facilitate repair of a damaged fabric while the same is on the papermaking machine. Additionally, the permeability of the fabric can be varied by changing the thickness of the links used to form the fabric. Moreover, the links can be made of injection molded plastic for reduced cost.

18 Claims, 16 Drawing Figures

FIG. 5a
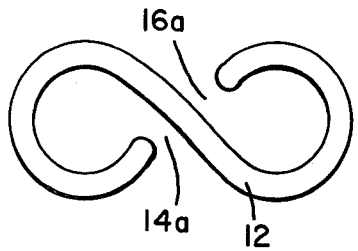
FIG. 5b
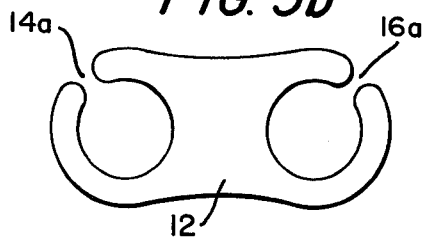
FIG. 5c
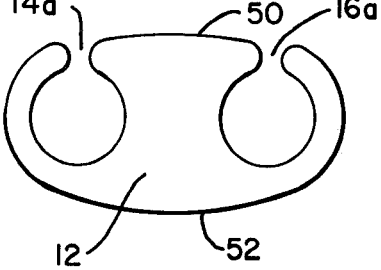
FIG. 5d
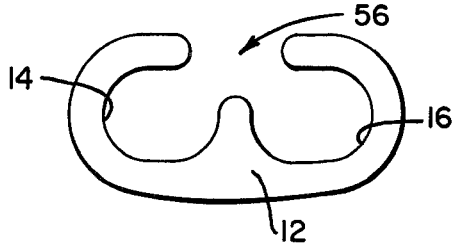
FIG. 5e
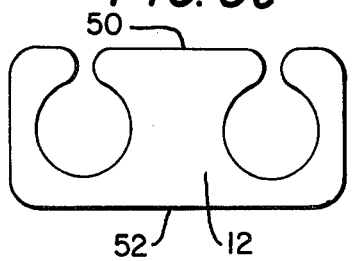
FIG. 5f
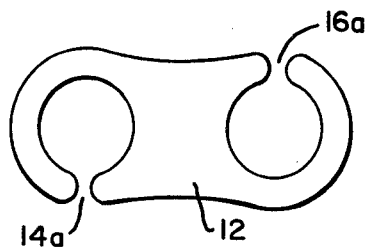
FIG. 5g
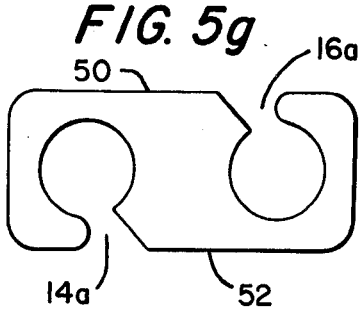
FIG. 5h
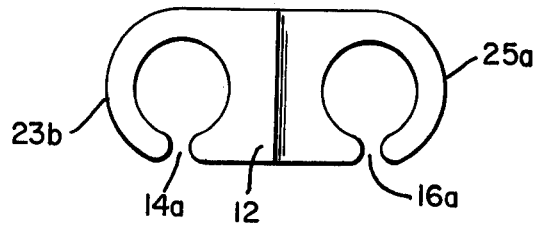
FIG. 5i
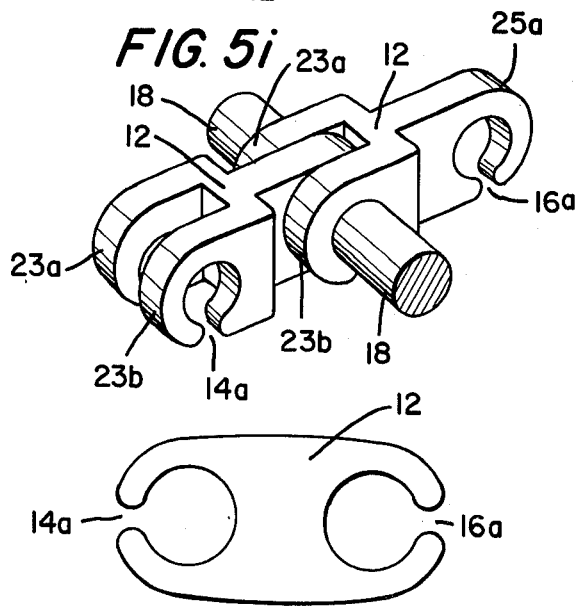
FIG. 5j

PAPERMAKERS FABRIC OF LINK AND PINTLE CONSTRUCTION

BACKGROUND OF THE INVENTION

1. Field of the Invention

The present invention relates to papermakers fabrics for supporting and conveying fibrous webs, and more particularly to a papermakers fabric formed from a plurality of individual links joined by pintles in an interconnected array to form an endless belt.

2. Description of the Prior Art

In papermaking machines, a papermakers fabric in the form of an endless, belt-like structure is supported on and advanced by various rolls on a papermaking machine during the papermaking process. Papermakers fabrics carry various names depending upon the portion of the machine in which they are used. By way of example, such fabrics can include forming fabrics, wet press felts, and dryer felts and fabrics, to name just a few.

Forming fabrics, also sometimes known as fourdrinier wires, or forming media, are utilized at the "wet end" of the papermaking process, where a water-fiber slurry is deposited thereon, and are commonly made from a length of woven fabric having its ends joined together in a seam to provide an endless belt. Such a fabric can also be formed by employing an endless weave process, thereby eliminating the seam. Either construction generally comprises a plurality of machine direction yarns and a plurality of cross machine direction yarns which have been woven together on a suitable loom to form a foraminous web of interwoven yarns having a predetermined permeability.

Recently, synthetic fibers have been used in the papermaking field, in whole or in part, to produce forming fabrics of superior quality as compared with the materials formerly employed. The use of synthetic fibers has increased to the point that almost all forming fabrics now are made from polyesters, such as those sold under the trademarks Dacron or Trevina; from acrylic fibers, such as those sold under the trademarks Orlon, Dynel, and Acrylan; from copolymers, such as those sold under the trademark Saran; or from polyamides, such as those sold under the trademark Nylon. The machine direction and cross machine direction yarns of the forming fabric can be of the same or of different materials or constructions, and they can be in the form of either a monofilament or a multifilament yarn.

Among the problems prominent in conventional, woven forming fabrics are edge curling and the need to control fabric permeability without adversely affecting fabric strength and stability. Additionally, the repair of distorted, torn, or otherwise damaged fabrics is both costly and time consuming, and because of the woven nature of the various papermakers fabrics, there is no easy way to repair them and oftentimes they must be replaced in their entirety.

A conventional dryer felt, which is used at the dry end of the papermaking machine, consists of an endless belt made from a two- or three-ply fabric wherein the various plies are defined by different groups of cross machine direction yarns. The plies are united into a unitary structure by a plurality of machine direction yarns. The yarns used to weave the most up-to-date dryer felts are made from monofilaments or multifilaments, and from such synthetic materials as polyesters or polyamides.

Because synthetic fibers are quite expensive, manufacturers are continually seeking to provide improved dryer felts, both in terms of lower cost and in terms of extended dryer felt reliability. Along these lines, it is important in certain dryer felts to maintain low liquid permeability, and one way of lowering the permeability is to weave more yarn to the inch. This, of course, adds further to the cost of such already expensive felts.

Many of the prior art woven papermakers fabrics employ seams by which the ends of the fabric are joined together through the use of a rod-like member called a "pintle" in order to facilitate insertion and removal of the fabric from the papermaking machine. A very common type of seam is one employing metal clipper hooks arranged in an alternating relationship on either end of the fabric belt, which serve to receive a pintle therebetween when the hooks are brought into interengaging relationship and thereby join the ends of the belt together.

In some papermakers fabrics, the ends of the fabrics are joined in an abutting relationship and held that way through the use of clipper hooks inserted in a webbing, the whole of which is attached to the underside of the fabric. Such an arrangement causes an undesirable seam mark in the paper sheet. Another problem with such seamed fabrics is bouncing of the fabric, which occurs when the seam of the fabric either makes or leaves contact with a machine roll. This bouncing causes further marking of the paper sheet and, in an extreme case, it could cause paper sheet breaks, as well as rapid weakening of the fabric structure in the seam area.

There is thus a need for a papermakers fabric which functions reliably in the various environments encountered in the course of the papermaking process, and which can be produced inexpensively and efficiently. It also is desirable that the papermakers fabric be endless in construction and easily repaired while in position on a papermaking machine. It is an object of the present invention to overcome the above-described shortcomings of existing papermakers fabric structures.

SUMMARY OF THE INVENTION

Briefly stated, in accordance with one aspect of the present invention, a papermakers fabric is provided in the form of a foraminous endless belt adapted to pass over and around a plurality of rollers and drums and to support and to convey a fibrous web. The fabric includes a plurality of elongated pintles arranged in spaced, side-by-side relationship and having their longitudinal axes in substantially parallel relationship. The pintles are interconnected by a plurality of links which span the spaces between adjacent pintles and which are arranged in alternating relationship so that alternate links extend from a first pintle to a second pintle positioned on one side thereof, and the intermediate links extend from the first pintle to a third pintle positioned on the opposite side of the first pintle. The alternating relationship of the links defines a plurality of openings in the resulting fabric to permit the passage of fluids therethrough with the relationship of the total area of the openings to the total area of the fabric being dependent upon the lateral spacing of the pintles one from another, and the lateral spacing of the links.

It is thus a primary object of the present invention to provide an improved papermakers fabric in which permeability can be easily and economically controlled.

It is another object of the present invention to provide a papermakers fabric constructed entirely of replaceable elements to facilitate repair thereof.

It is a further object of the present invention to provide a papermakers fabric which does not include a separate end joinder seam.

It is still another object of the present invention to provide a papermakers fabric which can be easily repaired while positioned for use on a papermaking machine.

Additional objects of the present invention will become apparent from a reading of the appended specification and claims, in which preferred but not necessarily the only forms of the invention will be described in detail, taken in connection with the accompanying drawings.

BRIEF DESCRIPTION OF THE DRAWINGS

FIGS. 5a to 5j show several alternative configurations in which the links can be provided.

DESCRIPTION OF THE PREFERRED EMBODIMENTS

Figure 1:
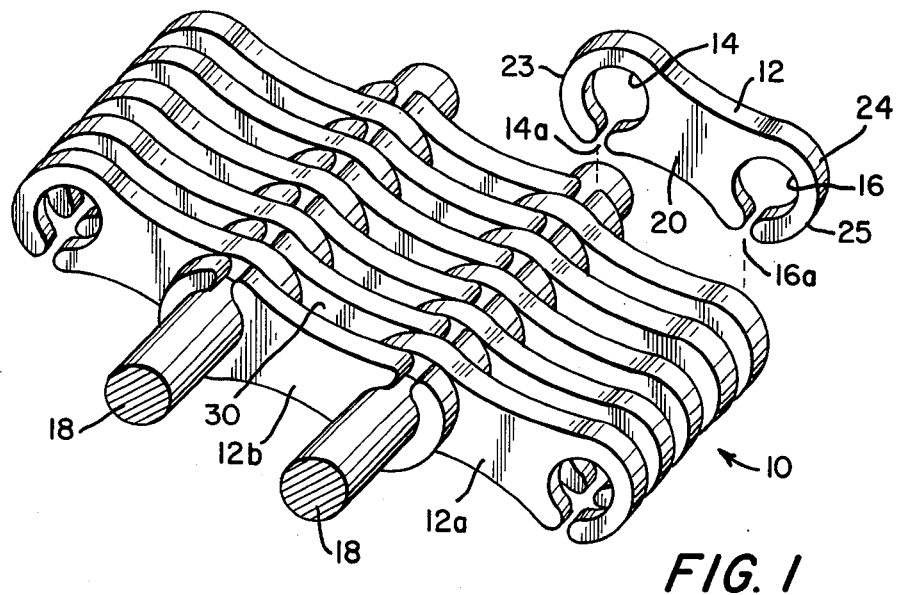
FIG. 1 is a fragmentary perspective view of a papermakers fabric construction in accordance with the present invention.
Figure 2:
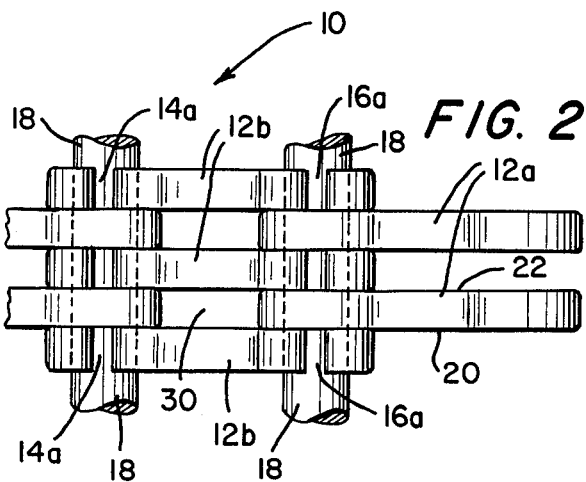
FIG. 2 is a fragmentary plan view of a portion of the fabric construction shown in FIG. 1.

With reference to FIGS. 1 and 2 of the drawings, a portion of a papermakers fabric embodying the teachings of the present invention is generally designated as 10. The fabric includes a plurality of links 12, each of which includes a pair of spaced apertures 14, 16, to receive an elongated, generally cylindrical pintle 18 to provide a fabric of desired length and width. As shown, a plurality of spaced pintles 18 are arranged with their respective longitudinal axes substantially parallel and positioned in a cross machine direction. Pintles 18 are of a predetermined length to define the width of the fabric and have a diameter of any convenient size. Interconnecting and spanning the space between two of the adjacent pintles 18 are a plurality of first links 12a the apertures of which receive pintles 18. First links 12a are spaced from each other along the axes of pintle 18 by the thickness of the ends of second links 12b, which can have a configuration similar to that of links 12a and which interconnect a pair of adjacent pintles, one of which is common to the first group of links 12a. In this way, a papermakers fabric is formed from a number of alternating links joined together by a series of pintles.

With reference to FIG. 1, a particular structural embodiment of a suitable link 12 is shown spaced above fabric 10, prior to attachment to a pair of pintles. Link 12 is an elongated structure having two substantially planar side faces 20, 22, only one of which is visible in FIG. 1, and which are positioned essentially parallel to but spaced from each other, and which terminate in a peripheral edge 24. As shown in FIG. 1, links 12 each have a narrow intermediate body portion 21 and enlarged ends 23, 25. Additionally, outwardly extending slots 14a, 16a are provided to interconnect each aperture 14, 16, respectively, with peripheral edge 24, each slot 14a, 16a having a width smaller than the diameter of pintle 18 to permit the ends of links 12 to be snapped over pintle 18 so that the latter are firmly but movably received in apertures 14, 16 and so that relative rotational motion can take place between pintles 18 and links 12 as the fabric so formed passes around a roll or drum of a papermaking machine (not shown).

Pintles 18 are arranged to extend in a cross machine direction and links 12 are snapped onto the pintles so that the links generally extend in a machine direction. Reference to "machine direction" and "cross machine direction" relates to the direction of movement of fabric 10 when installed in a machine in its position of intended use.

Figure 3A:
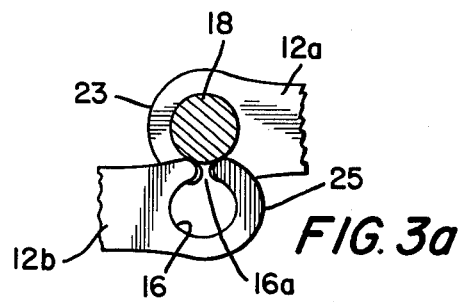
FIGS. 3a to 3c show the steps involved in assembling the links of the fabric to the pintles.
Figure 3B:
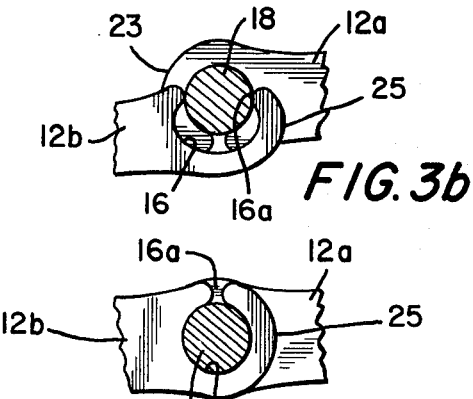
Figure 3C:
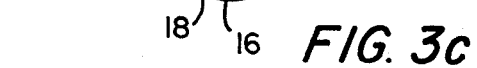

In the course of assembling fabric 10, one end of a link 12b is attached to a pintle 18 in the manner illustrated in FIGS. 3a through 3c. Initially, as shown in FIG. 3a, the pintle 18 is pressed against the outer end of slot 16a, or vice versa, to cause the slot to widen sufficiently (FIG. 3b) to permit pintle 18 to enter aperture 16. Upon completion of the insertion of the pintle, slot 16a returns to its original width (FIG. 3c) and thus link 12b is securely held by pintle 18.

As illustrated in FIGS. 1, 2, and 3, first links 12a are snapped over a pair of spaced pintles 18 in such a manner that slots 14a, 16a extend downwardly, in one direction perpendicular to the plane of fabric 10, whereas links 12b are snapped over a second pair of spaced pintles (only one of which is common to the pintles secured to links 12a) in such a manner that the slots 14a, 16a associated therewith extend upwardly, or in a direction opposite to that in which the slots of links 12a extend. In that manner links 12 alternate, by rows, in the orientation of their respective slots relative to the plane of the fabric 10, and the spaces between adjacent links 12a and 12b define openings 30.

Figure 4:
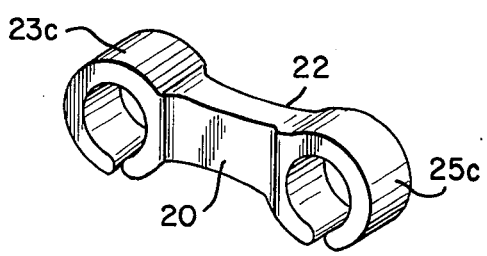
FIG. 4 shows a link construction wherein the ends thereof are thicker than the intermediate portion.

As can readily be seen, the sizes of openings 30 can be varied depending on the thicknesses of the individual links 12 and also the positioning of the apertures 14 and 16 relative to the ends of the links. In addition, it can be seen that a fabric can be provided with openings of uniform size by using links of uniform thickness and a fabric can be provided having patterns of openings of different sizes by appropriately choosing links of different widths. For example, links 12a can be of one thickness and links 12b of another to provide openings 30 of different widths, to thereby change the permeability of fabric 10, if desired. Also, links 12 can have non-planar faces 20, 22, as illustrated in FIG. 4, wherein link 12c includes ends 23c, 25c which are thicker than the intermediate portion, a factor which permits further variations in fabric permeability, either in the machine direction or in the cross-machine direction, by varying the relative thickness between the ends and the intermediate portion. Also, in conventionally woven, two or multi-layer fabrics, it is possible to have relative movement between the several layers resulting from variations in tension within the fabric and from roll deflections within the machine run. By using the link and pintle construction of the present invention, there is no such inter-layer relative movement because the links form a single layer fabric.

The links can be molded from plastic in various shapes and sizes. By employing a plastic material, it is possible to provide a link having resilient ends and slots to permit the link to be easily clipped onto a pintle in accordance with the assembly method illustrated in FIGS. 3a-3c. Moreover, if desired, the resilient links can be of a laminated construction to provide fabrics of widely differing permeability from single type of link structure by removing a suitable number of laminations to thereby change the thickness of the links. Such an arrangement permits standardization in the size and shape of the links, which allows for inexpensive mass production and avoids the necessity for stocking a wide variety of replacement link structures.

The links and pintles defining the fabric of the present invention can be made of materials other than plastics, if desired, and can be made from steel, aluminum, or other metals. The principal factors influencing material selection include cost, ease of assembly and replacement, compatibility with the materials carried by the fabric, and the environmental conditions to which the fabric is subjected. Although metals can be used to form the links, plastics are preferred because of the relatively light weight of such materials, the ease of manufacture (such as injection molding) resulting in lower manufacturing costs, the ability to provide the links in virtually any shape desired, the resistance to corrosion, and the ability to incorporate suitable additives to provide the desired lubricity, anti-static properties, heat conduction properties, moisture absorbtivity, fire resistance, and the like. Examples of suitable plastics include, but are not limited to, polyamides, polyesters, polycarbonates, acrylics, polyurethanes, and phenolics.

In addition to facilitating manufacture of a papermakers fabric by the use of links and pintles, another advantage of this type of construction is the elimination entirely, of a separate seam loop because the fabric is an integral, endless structure. In addition, the snap-on links provide yet another significant advantage in that, if a portion of a papermakers fabric should become damaged during use, it is an easy matter to replace the damaged links in the affected area with new links, and without the need for removing the fabric from the machine. Further, even if the fabric has been used for some time and its structure is distorted, it is nevertheless possible to repair the area and take into account the distortions in the fabric by using links of different lengths.

FIGS. 5a through 5i show examples of other possible configurations for the link elements. Each of the views represent one of the side surfaces of a link, and it should be understood that the opposite side of the link is the mirror image of the side shown. Although the peripheral edges 24 of the link are generally flat and perpendicular to the face shown; if desired, the edges can be rounded when viewed in a transverse direction.

FIG. 5a illustrates a link 12 which is generally S-shaped in which slots 14a and 16a are positioned further inward, face in opposite directions, and are positioned obliquely relative to the upper and lower surfaces of the fabric.

FIG. 5b shows a link 12 with slots 14a and 16a directed outwardly in diverging directions relative to each other and at an angle relative to the longitudinal axis of the link.

FIG. 5c shows a link 12 having slots 14a and 16a arranged in a manner similar to that of the links shown in FIG. 1, but with a generally flat top surface 50 and a generally arcuate bottom surface 52 which, as shown, is convex, but can be concave if desired.

FIG. 5d shows a generally E-shaped link 12 having a completely closed curved bottom surface 54 with the apertures 14, 16 for receiving the pintle having a common opening 56 defining a unitary slot.

FIG. 5e shows a link 12 similar to that of FIG. 5c but in which both upper surface 50 and lower surface 52 are substantially flat.

FIG. 5f shows a link 12 having a shape similar to that of the links shown in FIG. 1 but with the slots 14a and 16a on opposite sides thereof and extending in opposite directions.

FIG. 5g shows a link 12 having slots 14a and 16a arranged similar to the configuration shown in FIG. 5a except that the upper surface 50 and lower surface 52 are substantially flat, rather than rounded in a longitudinal direction as in the FIG. 5a embodiment.

FIG. 5h shows a link 12 which is in the shape of a yoke in the plan view shown and includes a pair of yoke arms 23a, 23b at one end and an oppositely directed single arm 25 at the other end. This configuration provides extra strength and gives good support for weak sheets.

FIG. 5i shows a link 12 which has longitudinally extending slots 14a and 14b, which permit controlled opening of the fabric under sudden stress, such as might occur if a wad of paper were to find its way between a machine roll and the fabric.

In general, the link configuration illustrated in FIG. 1 is preferred for general purpose use because of its high strength and resultant fabric stability. Additionally, that configuration is relatively easy to form by injection molding and gives good support for the paper sheets. However, in addition to the link configurations shown in FIG. 1 and FIGS. 5a–5i, which are merely illustrative and are not intended to be limiting in any way, it also would be possible to provide link shapes which either enhance or counteract air turbulence, and which could thereby reduce fluttering of the edge of the paper sheet under certain air flow conditions. In any event, it is readily apparent that the improved papermakers fabric herein shown and described has numerous advantages over the prior art structures, and permits virtually unlimited versatility in use, thereby achieving the objects hereinbefore set forth.

Although the present invention has been shown and described in terms of specific preferred embodiments, it will be appreciated by those skilled in the art that changes or modifications are possible which do not depart from the inventive concepts described and taught herein. Such changes and modifications as are deemed to fall within the purview of these inventive concepts are intended to be included in the scope of the appended claims.

What is claimed is:

1. A papermakers fabric in the form of a foraminous endless belt, said fabric having upper and lower surfaces and comprising:
   a plurality of elongated pintles having substantially equal lengths corresponding with the width of said belt, said pintles arranged in spaced, side-by-side relationship and having their respective longitudinal axes substantially parallel to each other;
   a plurality of link members interconnecting said pintles and extending transversely of the respective axes thereof;
   said link members each including a pair of spaced end portions, an intermediate portion between said spaced end portions, and top and bottom surfaces defining the upper and lower surfaces of said fabric, each of said end portions including an aperture sized to permit a pintle to be rotatably received therein, the spacing between said apertures defining the axial spacing between said pintles;
   said link members including open access slots extending from each of said apertures to one of said top and bottom surfaces to permit lateral access to said apertures;

said link members removably connected to and spanning the space between two adjacent pintles, each link member being individually removable from said pintles, through the open access slots thereof, independent of adjacent link members and without removal of said pintles;

said link members being arranged in alternating relationship so that alternate links extend from a first pintle to a second pintle positioned on one side thereof and the intermediate links extend from said first pintle to a third pintle positioned on the side of said first pintle opposite the side on which said second pintle is positioned;

said alternating relationship of said links defining a plurality of openings in said fabric to permit the passage of fluids therethrough, in such manner that there is uniformity of permeability across and along the fabric; and said permeability, as defined by the relationship of the total area of said openings to the total area of said fabric, being dependent upon the lateral spacing of said pintles and on the lateral spacing of said links, thereby providing the ability to produce fabrics of differing permeabilities.

2. The fabric of claim 1 wherein said alternating links interconnecting one pair of adjacent pintles define a first group of links and said alternating links interconnecting a second pair of adjacent pintles define a second group of links, each of said first and said second groups of links having one pintle in common, said first group of links having the respective slots thereof facing a first direction relative to said fabric and said second group of links having the respective slots thereof facing in a second direction relative to said fabric.

3. The fabric of claim 1 wherein each of said slots extends outwardly toward the same side of said fabric.

4. The fabric of claim 1 wherein said slots are parallel to each other.

5. The fabric of claim 1 wherein said slots are positioned obliquely relative to each other.

6. The fabric of claim 5 wherein said slots have outwardly facing openings which diverge outwardly relative to each other.

7. The fabric of claim 5 wherein said slots have outwardly facing openings which converge outwardly relative to each other.

8. The fabric of claim 1 wherein said slots of each of said links face the same surface of said fabric.

9. The fabric of claim 1 wherein said slots of each of said links face in opposite directions.

10. The fabric of claim 1 wherein said slots extend outwardly in opposite longitudinal directions relative to said links.

11. The fabric of claim 1 wherein said links include a unitary slot extending outwardly from said apertures to said link surface.

12. The fabric of claim 1 wherein said links have substantially flat surfaces defining the upper and lower surfaces of said fabric.

13. The fabric of claim 1 wherein said links have arcuate surfaces defining the upper and lower surfaces of said fabric.

14. The fabric of claim 1 wherein said links have a substantially flat surface defining one surface of said fabric and an arcuate surface defining the opposite surface of said fabric.

15. The fabric of claim 1 wherein said end portions of said links have a thickness greater than the intermediate portions thereof to provide a fabric of greater permeability than that obtainable with links having a uniform thickness.

16. The fabric of claim 1 wherein one end of said links is in the form of a yoke.

17. The fabric of claim 1, wherein said pintles are constructed with a material which resists deformation, thereby preventing lateral movement of said fabric.

18. The fabric of claim 1, wherein said slots are narrower in diameter than said apertures.

* * * * *